United States Patent Office 2,870,599
Patented Jan. 27, 1959

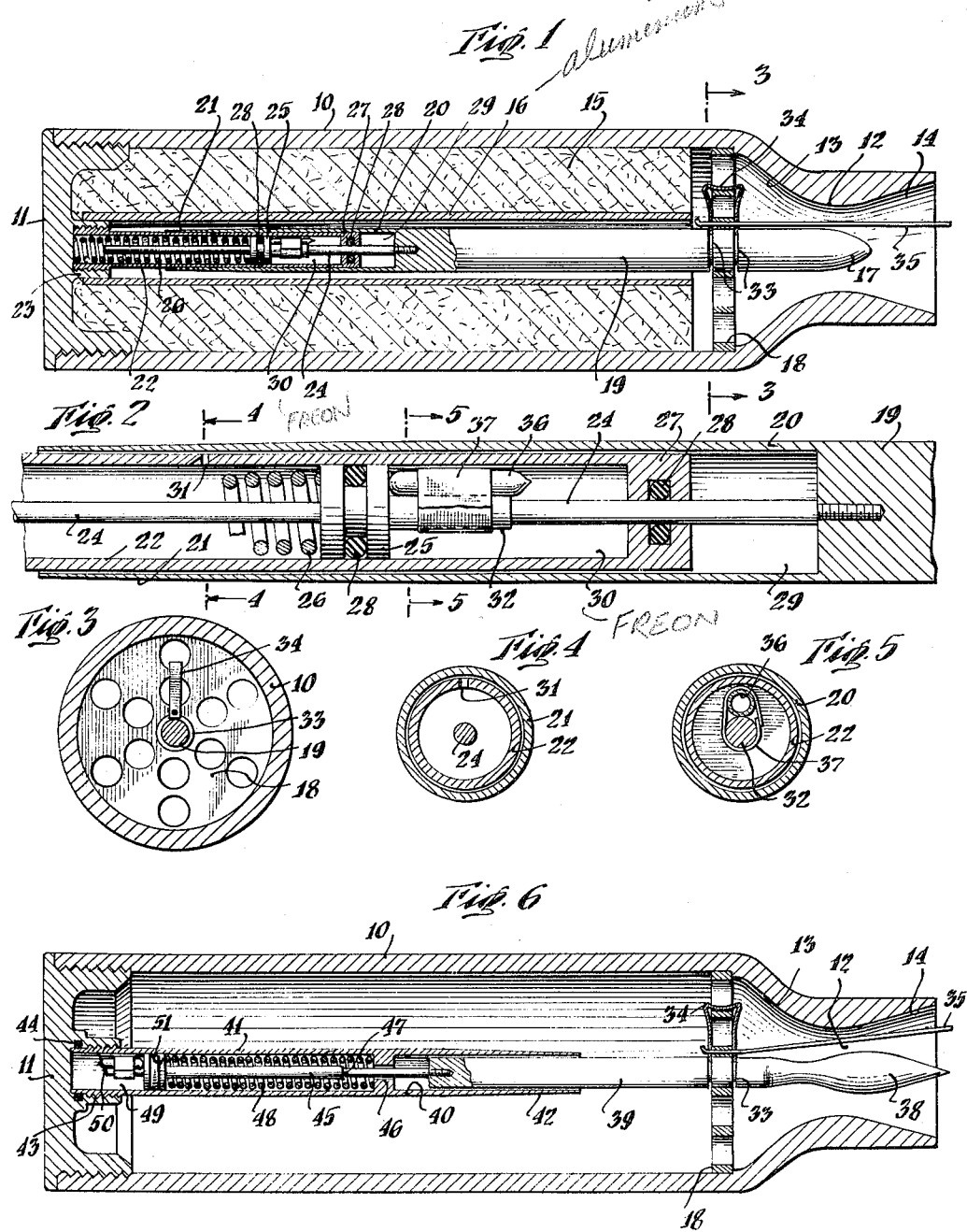

2,870,599

TEMPERATURE RESPONSIVE ROCKET NOZZLE

Theodore M. Long, Somerville, N. J.

Application December 6, 1952, Serial No. 324,472

14 Claims. (Cl. 60—35.6)

This invention relates to a functionally and structurally improved rocket assembly and in its more specific aspects aims to provide a nozzle structure to be embodied in a rocket.

As is well known, the burning rate of rocket propellants and especially solid propellants depends upon the temperature of the propellant charge at the time of ignition. Generally stated, a cold charge burns slower with a lower than normal rate of gas evolution. Conversely, a hot charge evolves gas at a higher than normal rate. This characteristic affects the operation of the rocket engine adversely because with slow burning the chamber pressure and thrust exerted are reduced and the burning time increased. On the other hand, with rapid burning of the heated propellant, the chamber pressure and thrust are high. This results in a need for excessively strong combustion chambers and increased strength in other parts so as to withstand the increased acceleration forces produced by the high thrust.

By means of the present invention, a rocket nozzle structure or assembly is produced which will be sensitive to differences in temperature so as to substantially instantaneously vary the throat area of the nozzle in a manner which compensates for the characteristics of the solid propellants under different temperature conditions.

An object is that of providing a rocket-throat structure, the area of which is reduced to increase chamber pressure and accelerate burning in the case of low initial temperatures. Also, by means of the present teachings, the throat area of the nozzle is increased under initially high temperatures so as to relieve excessive chamber pressure and accordingly reduce the propellent burning rate and gas evolution.

Thus a nozzle throat, continuously variable prior to ignition, is furnished over a range of temperatures with a positive temperature response such that the characteristics of the propellant are corrected. The apparatus will include relatively few parts, each simple and rugged in construction and with no adjustments of these parts being necessary.

Due to the reduction in stresses, a substantial weight saving may be effected and an increased combustion chamber volume is achievable due to the reduced wall thickness which may be incorporated. No increase in the over-all length of the rocket will be necessary and the latter will be able to withstand rough handling and large acceleration forces. Aside from this, no deterioration of performance will occur when the apparatus is stored for extended periods and regardless of the propellant employed.

With these and other objects in mind, reference is had to the attached sheet of drawings illustrating practical embodiments of the invention and in which:

Fig. 1 is a sectional side view of one assembly of apparatus constructed in accordance with the present teachings;

Fig. 2 is a fragmentary enlarged sectional side view of a detail of the mechanism;

Figs. 3, 4 and 5 are transverse sectional views taken respectively along the line 3—3 and in the direction of the arrows indicated in Fig. 1 and the lines 4—4 and 5—5 and in the direction of the arrows as indicated in Fig. 2; and Fig. 6 is a view similar to Fig. 1 but showing an alternative form of structure.

Referring primarily to Fig. 1, the numeral 10 indicates a casing section of a rocket body which may be entirely conventional and uncooled. The forward end of this section is conveniently closed by a plug 11 which may have screw threaded connection therewith. The rear end of the casing terminates in a nozzle throat 12 in advance of which as indicated at 13 a subsonic nozzle section is furnished. To the rear of throat 12 a supersonic section 14 is provided. As shown in this figure, a mass of propellent material 15 is disposed within casing 10 and is of the type which requires "end burning." This material fills the combustion chamber, the end of which is defined by the case throat. If a solid propellant of the nature specified is employed, then a tube 16 provides a shroud to which the material is attached. This will maintain the "end burning" characteristics of the material. The interior of tube 16 will furnish a space within which the mechanism hereinafter described may be disposed and tube 16 will serve as a shield to protect this mechanism from the combustion products.

When a thick-walled rocket charge of this kind is subjected to a different temperature, for example higher temperature, the outer part of the charge reaches this temperature before the cores of the charge does. As described before, the hotter propellant near casing 10 will then burn more rapidly. The more rapid burning of the outer part of the charge will distort the even "end burning" condition producing a larger burning area and higher pressures. The presence of tube 16 to which the propellant is attached provides a path through which heat may pass to and from the outer metal parts of rocket to the interior of the propellant to reduce any temperature difference and maintain temperature equilibrium between the inner and outer parts of the propellant charge. To aid in this process, the tube may be made of aluminum or other material of high thermal conductivity. Since the thermal conductivity of aluminum is many times that of typical propellants, the temperature equilibrium is considerably improved.

A restrictor 17 extends into the throat 12 and is positioned to the rear of a ported fixed support 18 with respect to which it is axially shiftable. That shifting is achieved by mounting the restrictor rod 19 for sliding movement with respect to the support, which latter, however, prevents lateral movements of the rod and restrictor. Towards its forward end rod 19 presents a bore portion which provides a brake cylinder 20. The front of this cylinder is diminished in wall thickness as indicated at 21. This diminution or tapering in thickness is perferably resorted to at a point adjacent the forward end of the assembly as in Fig. 2. A second tube or cylinder 22 has its forward end (its left-hand one as viewed in Fig. 1) secured against movement with respect to plug 11 by, for example, screw threads 23. A rod 24 has its rear end secured in any desired manner against movement with respect to the restrictor assembly. This rod may conveniently carry a piston portion 25 which engages the rear end of an expansible spring 26; the forward end of the spring bearing against plug 11.

The rear end of cylinder 22 may terminate in a head portion 27 carrying a suitable packing such as an O-ring 28. A similar packing 28 may be associated with the piston portion 25. Thus, a cavity 29 is provided between the head portion of cylinder 22 and the head of cylinder 20. A chamber 30 is also furnished between head portion 27 of cylinder 22 and the piston portion 25 of rod 24. As especially shown in Fig. 2, substantial clearance exists between the adjacent faces of cylinders 20 and 22. Also, a port 31 is conveniently formed through the wall of cylinder 22 so as to establish communication between the space intervening cylinder 20, shroud 16 and the space occupied by spring 26.

In use, chamber 30 is under pressure. According to the present teachings, this pressure is achieved by employing a liquid in that chamber (for example, Freon 12 or methyl chloride). A sufficient quantity is utilized to assure the presence of both liquid and vapor phases at all times. Under conditions of temperature greater than normal, the vapor pressure of the liquid will increase. This will force piston 25 and rod 24 to the left as viewed in Fig. 1 and against the resistance of spring 26. Due to the fact that restrictor rod 19 is coupled with rod 24 and carries restrictor 17, these latter elements will be similarly moved. It follows that a smaller cross-sectional area of the restrictor 17 is presented to the nozzle throat 12. Therefore, the effective cross-sectional area of the nozzle throat is increased so that the propellant temperature characteristics are corrected for. As will be understood in connection with chamber 30, an escape of the fluid therefrom is prevented at one end by piston 25 and packing 28, while at the opposite end corresponding packing in the head 27 of cylinder 22 prevents fluid escape.

The characteristics of spring 26, together with the dimensions of piston 25 and the properties of the liquid employed, determine the extent of the motion of rod 24 for any given temperature rise above normal. The spring 26 may embody any desired type of design such as conical-helical or cylindrical-helical. The extent of motion of rod 24 together with the contour of the restrictor 17 and the contours of the nozzle sub-sonic section 13 and the throat 12 determine the change in the cross-sectional area of the effective nozzle. In the event a temperature lower than normal is encountered, this cross-sectional area is decreased to correct for the propellant temperature characteristics. Movement of the parts is limited in one direction by the end of rod 24 engaging with or being arrested by plug 11 or its equivalent. Movement in an opposite direction is limited by the enlarged portion 32 of that rod contacting the inner face of head 27 of cylinder 22. It is apparent that the contours of the restrictor and the adjacent sections may be varied in accordance with the characteristics which it is desired to embody in the apparatus from an operational standpoint. For example, an increase in effective throat area with decreasing temperature may be obtained by suitable contour modification of the restrictor.

That portion of cylinder 22 which embraces space 29 and contains spring 26 vents to the combustion chamber within which material 15 is disposed by means of opening 31 and the clearance between cylinders 20 and 22. Thus, during prefiring conditions, any pressure unbalance which might occur from entrapped air or other gas will be relieved. The lower temperature stop 32 limits the entry of the restrictor 17 into the nozzle throat 12 through contact with the head 27 of cylinder 22. The high temperature stop provided by the forward end of rod 24 prevents damage to the spring 26. As will be understood, an ignitor mechanism of any proper type (not shown) is used to initiate propellant burning.

When this mechanism is fired, there occurs a rapid rise in pressure within the interior of casing 10. The tapered end 21 of brake cylinder 20 collapses under the initial pressure created and thus is caused to grip the wall of cylinder 22. As the pressure rises, this collapsing and gripping action progressively moves to the right (as shown in Figs. 1 and 2) along thicker sections of the tapered end portions 21 until a part of the brake cylinder is reached which is too thick to be collapsed or compressed. During the progressive collapsing motion, the annular passage between brake cylinder 20 and cylinder 22 is forcibly closed providing a very effective seal against the entry of combustion gases. This constricting action continues to a point at which the cylinder 20 grips cylinder 22 throughout the adjacent zones of contact to thus progressively lock the restrictor rod 19 in position to withstand the increasing thrust of the combustion gases on the restrictor 17 as chamber pressure increases. The restrictor rod 19 remains locked after locking occurs. As will be understood, support 18 serves as a trap in a conventional manner to retain unburned propellant in the combustion chamber.

The initial pressure rise acting upon the restrictor 17 "sets back" or imparts a small motion to the restrictor rod 19 before locking occurs between cylinders 20 and 22. Several closely inter-related factors are involved: the position and contour of the restrictor together with the contour of the nozzle which determine the pressure gradient in the escaping gases in the nozzle and therefore determine the pressure distribution on the restrictor, the rate at which the initial pressure rise occurs which depends upon the type of propellant and the propellant temperature at the time of firing, the spring force, the inertia of parts which depends upon their size and material, and the rapidity of locking which depends upon the proportioning of the members. The effect may be noted in Fig. 1 where the tapered end 21 of rod 19 is occupied by cylinder 22 so as to present only a small cross-sectional area of rod 19 (the area perpendicular to the motion of the rod) to the initial pressure while the cross-sectional area of the other end of rod 19, the restrictor 17, is entirely exposed. Until locking occurs, the initial pressure acting upon the greater cross-sectional area of the restrictor 17 produces a net force to "set back" the restrictor to the left in Fig. 1. This motion is generally small. The extent of the motion is determined by a preliminary series of firing tests, and compensation is made at the time of manufacture by lengthening the restrictor rod 19 a few thousandths of an inch or by changing the contour of the restrictor 17 slightly to provide the required nozzle throat area in the locked position. Experimentally it has been proven this "set back" motion is consistent and can be reduced to one or two thousandths of an inch which is a negligible amount.

Where the rocket is to be stored for periods of time, it is desirable to prevent any movement of the restrictor rod 19. To this end that rod may be formed with grooves 33. Fitting into these grooves are the forked ends of a spring clip 34. The latter may be passed through one of the ports of the support 18. An arming wire 35 extends through openings in the arm of clip 34 and through an opening in this fixed support. With the parts thus disposed, it is apparent that no movements of the mechanism and the restrictor will occur. However, by simply removing or pulling wire 35 rearwardly, the latter clears the support 18 and the clip 34. Therefore, this clip will spring free of grooves 33 to thus allow restrictor rod 19 to shift. By employing an element such as this clip to lock the parts, the loss of vapor and liquid within chamber 30 is minimized during storage of the mechanism. Such losses would normally occur due to the flexing of the packings or rings 28. Also, unnecessary wear of the parts during storage and handling are minimized.

Where it is desired not to place chamber 30 under pressure until the device is ready for firing a clip or similar locking structure as heretofore described may again be employed. Additionally, as shown especially in Fig. 2, a vial or container 36 for the liquid may be secured by tape 37 or otherwise to rod 24. This container is formed of glass or other fracturable material. It is mounted so that a portion of it extends beyond the part 32 of rod 24. Accordingly, when arming wire 35 or its equivalent is shifted, piston rod 24 will—under the influence of spring 26—move to the right as viewed in Figs. 1 and 2. This movement will result in a breaking of the container 36 and a consequent release of the liquid and vapor within chamber 30. When the liquid is released and the desired pressure established within this chamber, piston rod 24 will be forced to the left, or forwardly and the operation of the parts will proceed as heretofore described.

In Fig. 6, an alternative structure to that illustrated in Fig. 1 has been shown. Again the reference numeral 10 indicates the casing which defines the combustion chamber and which also receives a suitable propellant. The forward end of this casing may be closed by a plug 11. The rear end terminates in a nozzle throat 12 having a subsonic section 13 and a supersonic section 14. A support 18 corresponding to that aforedescribed is also utilized. Additionally, the restrictor rod 39 may be grooved or formed with openings 33 into which the ends of a clip 34 extend in order to initially hold the parts against movement. An arming wire 35 may also be provided for releasing the clip 34.

Contrary to the construction described in Figs. 1 to 5 inclusive, the restrictor 38 has a configuration different from that embodied in restrictor 17. Also, it is disposed in the supersonic section 14 of the nozzle. This restrictor is mounted by, or forms a part of rod 39 retained against lateral movement but guided for axial movement by the support 18. The forward end of rod 39 is slidably disposed within a brake cylinder 40. The latter may form an integral or fixed part of a cylinder 41. The brake cylinder 40 has its walls tapered in a rearward direction as indicated at 42 and this cylinder as well as the cylinder 41 is secured against movement with respect to the casing 10 by, for example, screw threads 43 which couple the forward end of this cylinder to plug 11. If necessary, packing 44 may be disposed at this point to prevent any leakage between the parts.

A rod 45 has its rear end secured against movement with respect to restrictor rod 39. This rod passes through an opening 46 in the portion providing a partition between cylinders 40 and 41. The rod is conveniently formed with a shoulder or enlarged part 47 which, in cooperation with this portion, provides a stop limiting movement of rods 45 and 39 to the right as viewed in Fig. 6. This structure functions as a high temperature stop. The opposite end of rod 45 in cooperation with plug 11, or its equivalent, functions as a low temperature stop. The rod is encircled by a spring 48 within cylinder 41. Its forward end extends into a chamber 49. At this point, it may carry a frangible container 50 corresponding to container 36 and which extends beyond the forward end of rod 45 to be shattered against the inner face of plug 11. A piston 51 is carried by this rod at a point short of its forward end and is provided with a suitable packing such as an O-ring. It will also be noted that adequate clearance for the flow of air or fluid is provided between restrictor rod 39 and the inner face of cylinder 40.

The operation of this apparatus prior to propellant ignition involves the presence of gas under pressure within chamber 49. If the container 50 is not employed, then a liquid of suitable characteristic and embracing both liquid and vapor phases is preferably employed as heretofore traversed. The detent or locking structure provided by the clip 34 or its equivalent may or may not be used, as also heretofore traversed and if the mechanism is to be stored for relatively short periods of time, then a container or flask 50 will be dispensed with and the liquid will be initially disposed within the chamber into which the forward end of rod 45 extends.

In any event, with initial temperatures greater than normal, the increase in vapor pressure forces piston 51 and rod 45 to the right as in Fig. 6 to thus compress spring 48. Therefore, with restrictor rod 39 moving with rod 45 a smaller diameter of the restrictor 38 is disposed in the nozzle throat 12. Accordingly, the cross-sectional area of the nozzle throat is increased. Similarly, if lower than normal initial temperatures are experienced, the vapor pressure within chamber 49 will be reduced, which will allow spring 48 to force a larger section of restrictor 38 to the left into the nozzle throat 12. As heretofore traversed, the characteristics of this spring, the dimensions of the piston rod assembly, the properties of the liquid and the contours of the restrictor and nozzle together with its sections 13 and 14 determine the variation of nozzle throat cross-sectional area with respect to temperature. This will be in accordance with propellant requirements. Connecting the interior of cylinder 41 with the combustion chamber defined by casing 10 during non-firing operation prevents undesirable pressure reactions. As before brought out, the forward end of rod 45 in cooperation with plug 11 prevents the restrictor 38 from entering the nozzle throat 12 to too great an extent. Temperature stop 47 in cooperation with the head portion through which the passage 46 is formed acts to prevent damage to spring 48.

When propellant burning is initiated, the tapered wall section 42 and the cylindrical section of brake cylinder 40 grip the forward end of restrictor rod 39. Thus, the restrictor 38 is locked in position within the nozzle throat 12. With the restrictor 38 placed in the diverging section of the nozzle, the "set back" motion previously described may be in either direction depending upon the restrictor contour which depends in part upon the throat area variation required by the type of propellant used, for the restrictor contour determines to a greater degree in this situation the cross-sectional areas presented to the initial pressure gradient in the nozzle. Balancing these areas against one another with consideration for the gradient, within the limits required by the propellant, reduces the previously unbalanced forces on the restrictor and its supporting members. This makes the motion of the restrictor easier to control. As before, the extent of the motion can be determined by preliminary firing tests, and compensation, if needed, can be made at the time of manufacture by changing the length of the restrictor rod 39 or by changing the contour of restrictor 38 to provide the required nozzle throat area in the locked position.

Thus, among others, the several objects of the invention as specifically afore noted are achieved. Obviously, numerous changes in construction and rearrangement of the parts might be resorted to without departing from the spirit of the invention as defined by the claims.

I claim:

1. A rocket including in combination a body, means providing a throat portion of variable area as a part of said body, a pressure chamber contained within said body, a body of fluid having liquid and vapor phases disposed within said chamber, said body of fluid having a pressure which is a function of temperature, means controlled by the effective pressure therein for so varying the area of said portion, and a collapsible tube surrounding said chamber actuated by combustion gases for sealing said chamber against the entry of said gases.

2. A rocket including in combination a body, means providing a throat portion of variable area as a part of said body, a pressure chamber contained within said body, a body of fluid having liquid and vapor phases disposed within said chamber, said body of fluid having a pressure which is a function of temperature, means controlled by the pressure therein for adjusting the effective throat area in one direction and a spring also carried by said body and connected to control the effective area of the throat portion in an opposite direction, and a collapsible tube surrounding said chamber actuated by combustion gases for sealing said chamber and spring against the entry of said gases.

3. A rocket including in combination a body, a throat portion forming a part of said body, a shiftable member for varying the effective area of said throat portion, propellant temperature responsive means for shifting said shiftable member perpendicularly to the cross-section of said throat, and locking means effected by ignition of the propellant of the rocket to render said propellant temperature responsive means inoperative.

4. A rocket including in combination a body, a throat portion forming a part of said body, a restrictor axially positionable in said throat portion for varying the effective area of the latter, propellant temperature responsive means carried by said body connected to said restrictor to position the latter in accord with propellant temperature up to the instant of firing, and means to hold the restrictor in said position to control rocket combustion during firing.

5. A rocket including in combination a body, a throat portion forming a part of said body, a restrictor axially positionable in said throat portion for varying the effective area of the latter, propellant temperature responsive means carried by said body operatively connected to said restrictor to position the latter thereby varying the effective throat area previous to firing of said rocket in the presence of temperatures other than normal and means to hold the restrictor in said position to control rocket combustion during firing.

6. In a rocket in combination a body, a nozzle portion forming a part of said body, propellant temperature responsive means and spring means to position a contoured restrictor axially in said nozzle portion for varying the effective throat area of the latter, said restrictor contour being balanced in cross-sectional area with respect to the pressure gradient existing in said nozzle portion to reduce the forces on the propellant temperature responsive means and spring means caused by the pressure gradient and the forces caused by the combustion pressures in the body.

7. In a rocket in combination a restrictor of said rocket disposed in the throat portion of the latter, a rod to move said restrictor and vary the effective area of the nozzle defined by said portion, a member enclosing a portion of said rod, means connected to said rod for shifting the latter, said member being collapsible into locking engagement with said rod under the action of presures generated within the combustion chamber of said rocket.

8. In a rocket in combination a restrictor of a rocket disposed in the throat portion of the latter, a rod connected to the restrictor to move said restrictor and vary the effective area of the nozzle defined by said portion, a member enclosing a portion of said rod, means connected to said rod for shifting the latter, said member providing a tapered wall thickness adjacent said rod such that the thinner sections of said wall will more easily collapse into constricting engagement around said rod to lock the latter as the pressures generated within the combustion chamber of the rocket act upon said member.

9. In a rocket having a combustion chamber, a throat portion and a restrictor defining with said portion a nozzle, in combination a rod connected to the restrictor of the rocket to move said restrictor and vary the effective area of the nozzle defined by said portion, a member enclosed by a portion of said rod, means connected to said rod for shifting the latter, said rod portion being collapsible into locking engagement with said member under the action of pressures generated within the combustion chamber of said rocket.

10. In a rocket having a combustion chamber, a throat portion and a restrictor defining with said portion a nozzle, in combination a rod connected to the restrictor of the rocket to move said restrictor and vary the effective area of the nozzle defined by said portion, a member enclosed by a portion of said rod, means connected to said rod for shifting the latter, said rod portion providing a tapered wall thickness adjacent said member such that the thinner sections of said wall will more easily collapse into constricting engagement around said member to lock said rod portion as the pressures generated within the combustion chamber of the rocket act upon said wall.

11. A rocket including in combination a body containing a propellant charge, a throat portion forming a part of said body, a restrictor positionable in a direction axially of said body to vary the effective area of said throat portion and propellant temperature responsive means—having a transient temperature response to rocket temperature environment corresponding to the transient temperature response of said charge to rocket temperature environment by virtue of the manner of attachment to the rocket body and placement within the propellant charge—for effecting such positioning to afford control of propellant burning characteristics.

12. A rocket including in combination a body containing a propellant charge, a throat portion forming a part of said body, a restrictor also connected to said body and concentrically disposed with respect to said propellant charge, means whereby said restrictor is shiftable in a direction axially of said body to vary the effective area of said throat portion, said body providing a pressure chamber at a point at the center of said charge to receive a fluid—the pressure of which varies in response to propellant temperature changes—and means operatively connected to move in response to such pressure variations to shift said restrictor with respect to said throat portion.

13. A rocket including in combination a body containing a propellant charge, a throat portion forming a part of said body, a restrictor also connected to said body and concentrically disposed with respect to said propellant charge, means whereby said restrictor is shiftable in a direction axially of said body to vary the effective area of said throat portion, said restrictor providing a pressure chamber at a point at the center of said charge having movable parts, a body of fluid having liquid and vapor phases disposed within said chamber and means connected to one of the movable parts of said chamber to shift said restrictor with respect to said throat portion to afford control of propellant burning characteristics.

14. A rocket including in combination a body, a throat portion forming a part of said body, propellant temperature responsive means positioning a restrictor to vary the effective throat area of said throat portion, said propellant temperature responsive means incorporating a body of fluid having liquid and vapor phases initially stored in a sealed container in said body, locking means for said restrictor in storage and means external to the rocket for release of the stored fluid for operation of said propellant temperature responsive means cooperative with unlocking said locked restrictor.

References Cited in the file of this patent

UNITED STATES PATENTS

| | | |
|---|---|---|
| 1,013,773 | Hildebrand et al. | Jan. 2, 1912 |
| 2,402,363 | Bradbury | June 18, 1946 |
| 2,457,839 | Skinner | Jan. 4, 1949 |
| 2,460,289 | Hickman | Feb. 1, 1949 |
| 2,489,953 | Burney | Nov. 29, 1949 |
| 2,503,684 | Pope | Apr. 11, 1950 |
| 2,504,648 | Chandler | Apr. 18, 1950 |
| 2,510,506 | Lindhagen et al. | June 6, 1950 |
| 2,519,905 | Hickman | Aug. 22, 1950 |
| 2,552,497 | Roach et al. | May 8, 1951 |
| 2,583,570 | Hickman | Jan. 29, 1952 |
| 2,612,747 | Skinner | Oct. 7, 1952 |
| 2,637,973 | Lawrence | May 12, 1953 |
| 2,670,989 | Ramsay | Mar. 2, 1954 |

FOREIGN PATENTS

| | | |
|---|---|---|
| 406,209 | Italy | Oct. 25, 1943 |
| 250,563 | Switzerland | June 16, 1948 |

OTHER REFERENCES

"Vapor Pressure-Temperature Curves," Hydron Metal Bellows, Clifford Manufacturing Co., Boston, Mass. (Copyright 1940.)